Dec. 17, 1935.　　　O. W. GREENE　　　2,024,639
METHOD AND APPARATUS FOR COOLING AND HOLDING LIQUIDS
Filed Dec. 7, 1934　　　4 Sheets-Sheet 1
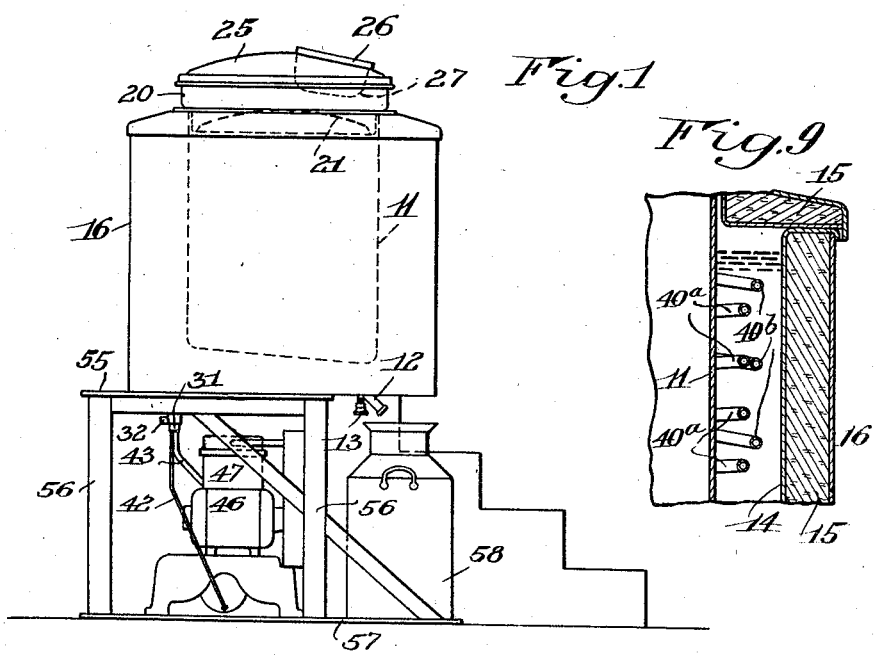
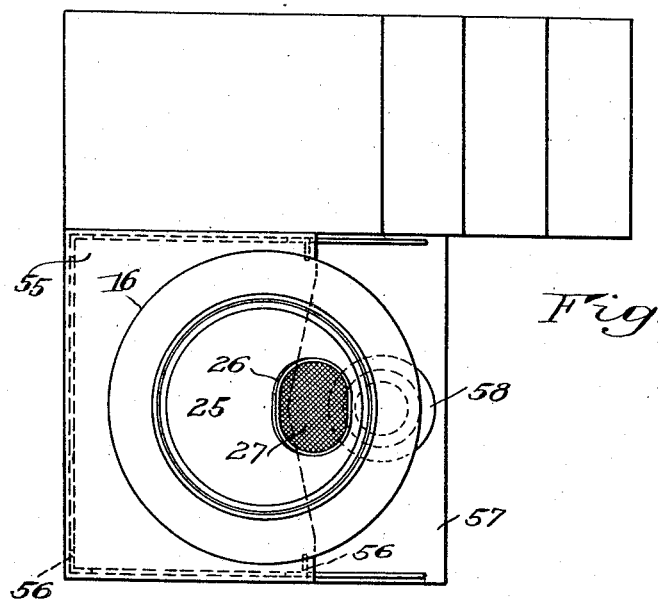
INVENTOR
Otto W. Greene
BY Edward H. Cumpston
his ATTORNEY Dec. 17, 1935.        O. W. GREENE        2,024,639
METHOD AND APPARATUS FOR COOLING AND HOLDING LIQUIDS
Filed Dec. 7, 1934        4 Sheets-Sheet 2
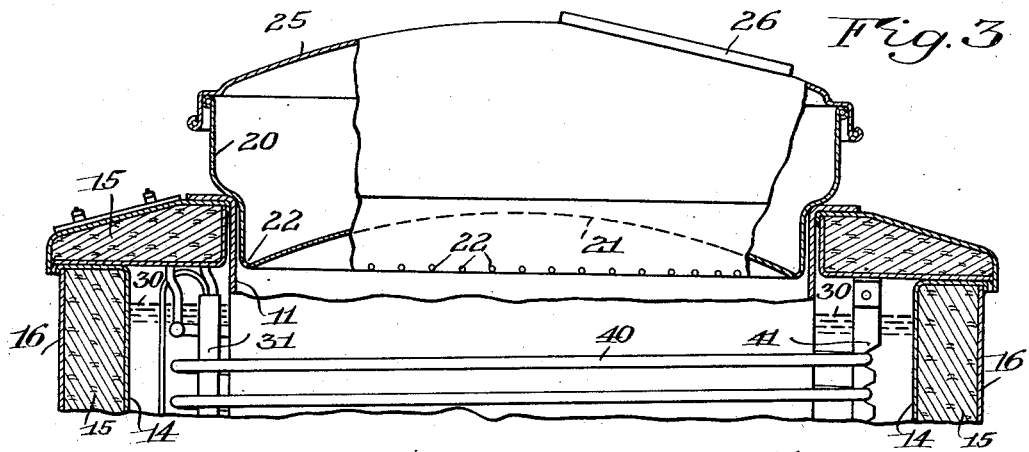
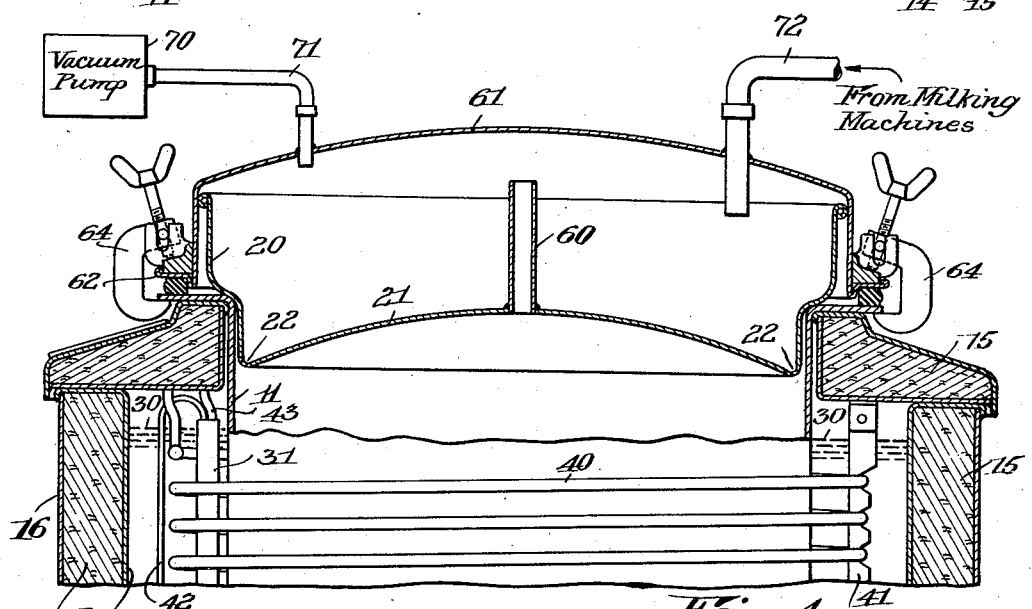
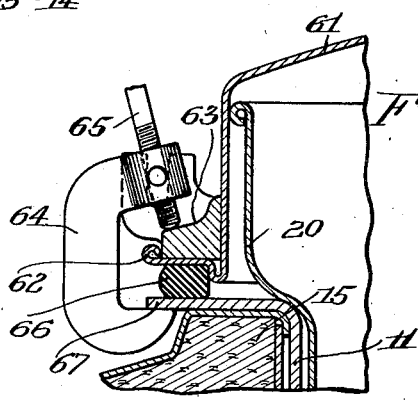
INVENTOR
Otto W. Greene
BY Edward H Cumpston
his ATTORNEY Dec. 17, 1935.   O. W. GREENE   2,024,639
METHOD AND APPARATUS FOR COOLING AND HOLDING LIQUIDS
Filed Dec. 7, 1934   4 Sheets-Sheet 3
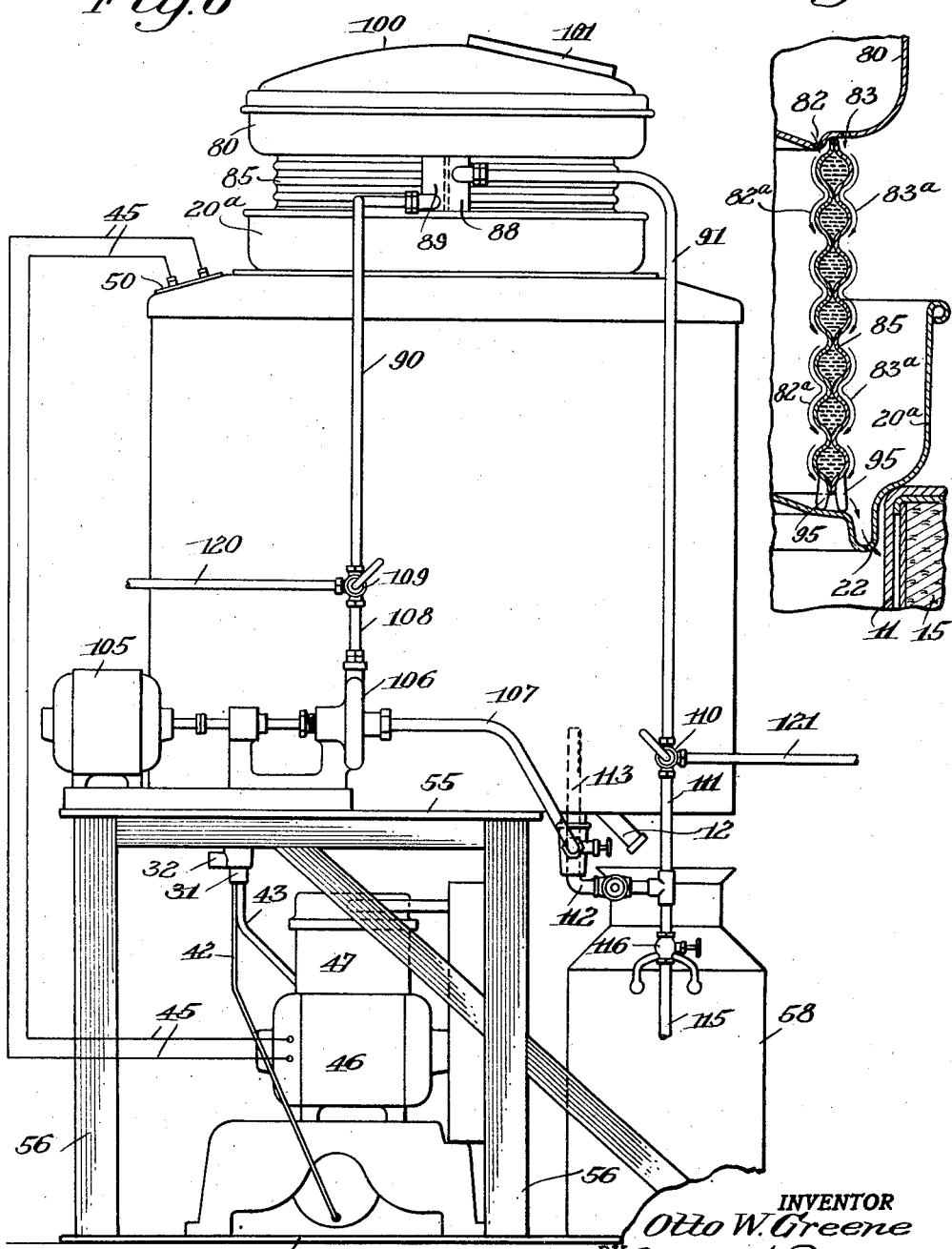
INVENTOR
Otto W. Greene
BY Edward H. Cumpston
his ATTORNEY

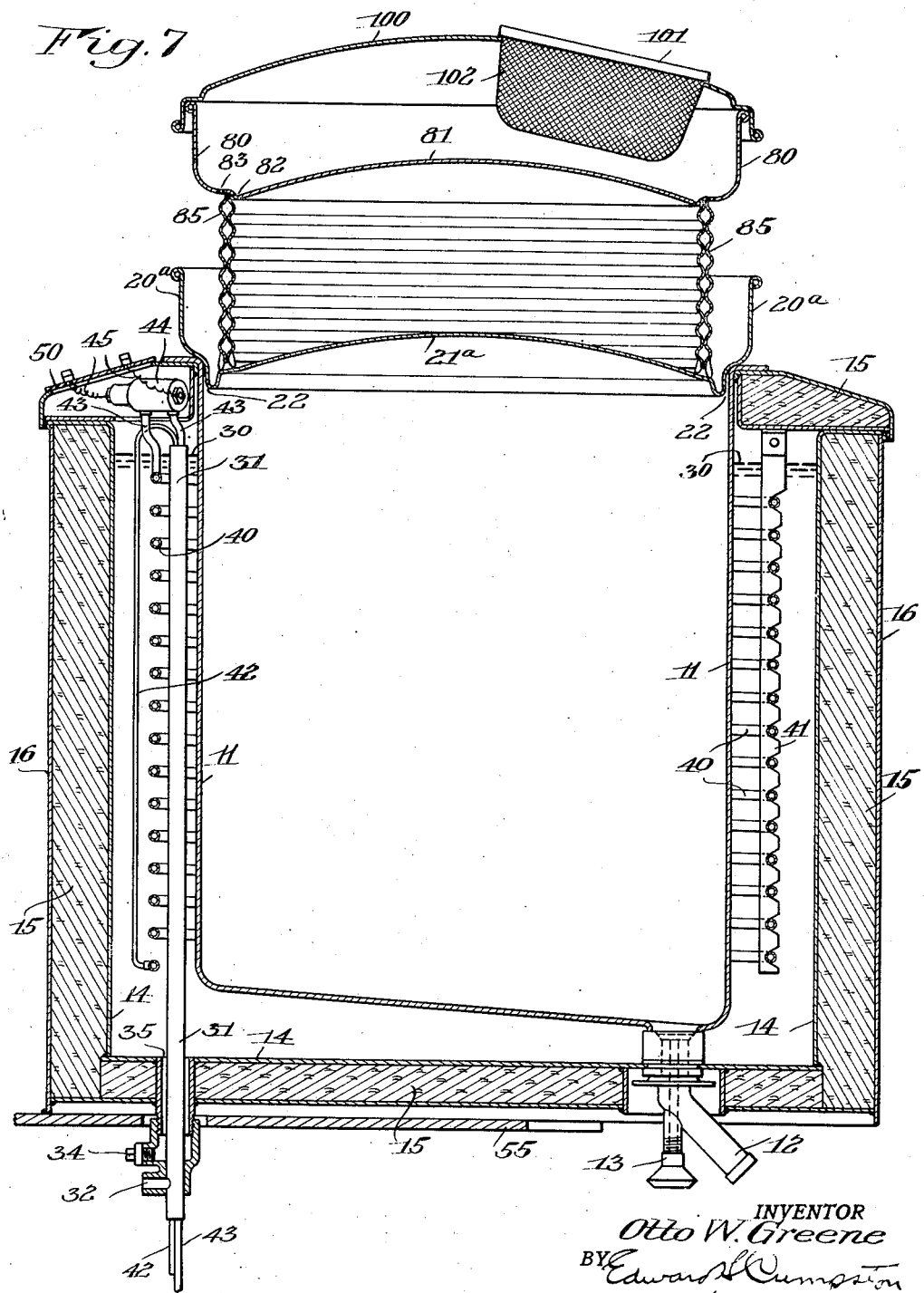

Patented Dec. 17, 1935

2,024,639

UNITED STATES PATENT OFFICE 2,024,639

METHOD AND APPARATUS FOR COOLING AND HOLDING LIQUIDS

Otto W. Greene, Elyria, Ohio, assignor to The Pfaudler Co., Rochester, N. Y., a corporation of New York Application December 7, 1934, Serial No. 756,524

19 Claims. (Cl. 62—141)

This invention relates to a method and apparatus for cooling and storing liquids, such, for example, as milk, although many features of the invention are applicable to other liquids in general.

An object of the invention is the provision of a generally improved and more satisfactory method for cooling and storing liquid such as milk, and a generally improved and more satisfactory apparatus for this purpose.

Another object of the invention is the provision of simple apparatus of low cost and minimum upkeep expense, which may be used both for cooling and for holding or storing milk and other liquids in an efficient and convenient manner.

Still another object is the provision of such apparatus with additional or supplementary cooling means which may be added or removed as desired, in accordance with varying conditions, thus rendering the apparatus extremely flexible.

A further object of the invention is the provision of apparatus so designed and constructed that relatively rapid cooling of the liquid may be attained at intervals, such as at milking time for example, even though the capacity of an associated refrigerating unit over a long period of time may be relatively low.

A still further object is the provision of a simple and compact self-contained unit for cooling and storing milk and other liquids, which may be readily installed and easily used.

A still further object is the provision of apparatus of the kind above indicated which is so designed and constructed that it may be employed satisfactorily to receive milk from milking machines, as well as to receive milk which has been milked by hand.

To these and other ends the invention resides in certain improvements and combinations of parts, all as will be hereinafter more fully described, the novel features being pointed out in the claims at the end of the specification.

In the drawings:

Fig. 1 is a diagrammatic side elevation of apparatus constructed in accordance with one embodiment of the invention;

Fig. 2 is a plan thereof;

Fig. 3 is a vertical section taken substantially centrally through the upper part of the apparatus shown in Figs. 1 and 2, illustrating details;

Fig. 4 is a view similar to Fig. 3, showing a slightly different embodiment for use with milking machines;

Fig. 5 is a view similar to a fragment of Fig. 4 on a larger scale, illustrating details of the vacuum sealing means;

Fig. 6 is a view similar to Fig. 1, illustrating another embodiment of the invention;

Fig. 7 is a vertical section taken substantially centrally through part of the apparatus shown in Fig. 6;

Fig. 8 is a vertical section similar to a part of Fig. 7, on a larger scale, and Fig. 9 is a fragmentary vertical section illustrating a modified form of coil.

The same reference numerals throughout the several views indicate the same parts.

Cow's milk as it comes from the cow has a temperature of over 90° F. At this temperature, bacteria multiply with great rapidity, and authorities agree that the milk should be cooled as quickly as possible to a temperature of 50° F. or below, and should thereafter be maintained at this temperature, insofar as possible, up to the time of use. It is also desirable that the milk be aerated, at least to some extent, as this assists greatly in removing various odors from the milk, which may be due to the food the cow has eaten or to other causes.

Various arrangements have been heretofore proposed for cooling the milk, but all of them are open to one objection or another. In some of the prior arrangements, the milk is not cooled with sufficient rapidity. In some, the expense of cooling is too great. In some, the milk, although cooled, is not aerated. In some, the milk while being cooled flows in such manner that it is largely exposed to surrounding air with consequent danger of contamination by dirt and bacteria. In some, the milk after being cooled must be transferred to a storage container, involving one more handling of the milk and consequent further danger of contamination.

Some of these or other objections are inherent in all prior milk cooling apparatus of which I have knowledge. The apparatus of the present invention, on the contrary, is designed to overcome all of these defects, and to provide a structure in which the milk while being cooled is sufficiently aerated, in which the cooling operation takes places in a closed compartment rather than in one open to the atmosphere so that there is no danger of contamination, in which the cooling unit serves itself as a storage or holding unit so that no separate transfer of the cooled milk to a storage container is necessary, which will cool it at a relatively rapid rate, and which is so designed that the expense of operation is relatively low.

Referring now to Figs. 1 to 3, inclusive, and to the lower part of Fig. 7, there is shown a container 11 having substantially closed side and bottom walls so that this container may be used for holding or storing liquid. The container is provided with an outlet 12 controlled by any suitable valve 13 so that liquid may be withdrawn when desired. Around the container and spaced therefrom is a liquid-tight receptacle 14 for holding a supply of cooling fluid in external contact with the side and bottom walls of the container 11. Suitable thermal insulation 15 is preferably provided around the receptacle 14, and this insulation may in turn be covered by a jacket 16. The container 11 and receptacle 14 are suitably secured to each other so as to be normally immovably fixed to each other.

The container 11 preferably has a wide open top or mouth, as shown in the drawings, and across the top opening or mouth of the container and forming substantially a top closure for the container is distributing means or baffle means 20, having a bottom 21 sloped downwardly toward the sides of the container 11 as shown. At the lower outer edges of this bottom 21 there are a plurality of restricted outlet orifices such as the holes 22, inclined slightly downwardly and outwardly so that liquid flowing out through these holes will be directed against the inner surfaces of the side walls of the container 11 and will flow down these side walls in the form of a thin film. The outlet openings are preferably arranged around the entire periphery of the distributing means or baffle means so that any liquid supplied to the distributing means 20 is distributed substantially uniformly around the periphery of the container 11 and flows down all parts of the side walls thereof.

A removable cover 25 extends across and covers the top of the distributor 20 and is provided with an opening 26 through which liquid may be poured into the distributor, a suitable strainer 27 preferably being provided, as shown. As the cows are milked, the milking pails full of milk may be dumped into the distributor 20 through the opening 26 and strainer 27, one pail at a time, as fast as each milking pail becomes full. Thus the hot milk fresh from the cow remains at its original temperature only for a minimum of time, being quickly subjected to the cooling action, which is advantageous in keeping down the growth of bacteria. The distributor serves as a temporary reservoir capable of holding one or several pails full of milk, and as soon as any milk is placed in this distributor it begins to run out through the restricted openings 22 onto the inner side walls of the container 11 and flows in a film down these side walls.

This flow in the form of a film provides sufficient aeration of the milk in most cases, and the flowing film of milk is also rapidly cooled to the desired low temperature by means of the cooling fluid in the space between the container 11 and the receptacle 14, which is kept cool by refrigerating means described below. The milk flows down to the bottom of the container 11, being thoroughly cooled by the time it reaches the bottom, and gradually accumulates in the bottom of the container, which serves as a storage vessel capable of holding a considerable quantity of milk. Thus after the cooling and aerating action, the milk does not have to be transferred to another vessel but remains in this same container 11 until it is desired to withdraw it through the outlet 12 for shipment or for other uses. Of course, as the milk accumulates in the container, it follows that the length of the travel of the film of milk down the side walls of the container gradually becomes less and less, so that there is less cooling action on the milk in the form of a film. On the other hand, a constantly increasing body of cooled milk is built up in the container, and even if the film of new milk flowing into the partially filled container 10 does not become sufficiently cooled as it flows down the side walls, it will quickly be cooled to the proper temperature when it mingles and becomes mixed with the substantial body of already cooled milk which, in turn, is constantly being cooled still further by contact with the bottom and lower portions of the side walls of the container.

The cooling fluid in the space between the container 11 and the receptacle 14 may be in the form of a vapor or gas, but preferably is a liquid, and in most cases this liquid is preferably plain water, which may be maintained to a height 30 (Figs. 3 and 7) at or near the open top of an overflow conduit 31 which extends downwardly and out through the bottom of the receptacle 14 to an overflow outlet passageway 32. When it is desired, for any reason, to drain the cooling liquid, this may be done by removing a plug 34 which will permit the liquid to flow out through an annular space 35 around the conduit 31.

The water or other refrigerating liquid around the container 11 is refrigerated by suitable means such as a refrigerating coil 40 running around the container 11 in the space between it and the receptacle 14, and supported at intervals by suitable supports 41. This refrigerating coil carries any suitable fluid refrigerant supplied to it, for example, by the refrigerant supply line 42 which may conveniently extend into the receptacle through the overflow conduit 31 as shown, and the outlet end of the coil is connected to the suction or return line 43. An expansion valve 44 (see Fig. 7) of known type is interposed in one line or the other, and incorporated in this expansion valve is a thermostatic control electrically connected by wires 45 (Figs. 6 and 7) to a motor 46 (Figs. 1 and 6) driving a compressor 47 suitably connected to the conduits 42 and 43 to force the refrigerating fluid through the coil 40.

Preferably the thermostat is so adjusted that it will not shut off the compressor motor until a considerable quantity of ice has been formed on the coil 40. According to the preferred method of operation of this apparatus, the motor is started several hours in advance of the time when the apparatus is to be used for cooling milk. During this period of advance operation, the refrigerating means not only cools off the water in the receptacle 14, but actually forms large quantities of ice in place on the coil 40. Then when this reserve refrigerating supply of ice has been built up, the pouring of the milk into the container is started, and the milk may be poured in relatively rapidly at a higher rate than can normally be cooled by the steady capacity of the refrigerating means, because the ice on the coil acts as a reserve supply of refrigeration and will melt during the pouring of the milk into the container thus furnishing additional cooling for the water faster than could be done merely by straight ordinary operation of the refrigerating apparatus if this reserve supply of ice had not been formed in advance on the coil. By operating the apparatus in this novel and improved manner, relatively rapid cooling of a large quantity of milk can be attained in an efficient and inexpensive manner, much faster than would otherwise be possible with refrigerating apparatus of the same capacity.

A movable door 50 is preferably provided at the top of the receptacle 14 near the valve and thermostat 44, not only so that access may be had to this valve and thermostat for adjusting them, but also so that the operator may look into the receptacle from time to time and observe the quantity of ice which has been formed on the refrigerating coil.

An agitator of any convenient type may be used to stir up the contents of the container 11. Thus cream which has risen to the top of milk during storage may be mixed substantially uniformly through the milk before the milk is drawn off.

The container 11 and receptacle 14 are preferably supported by a platform 55 mounted on columns 56 resting on a base plate 57, and the motor 46 and compressor 47 and associated parts may be mounted on this base plate 57 beneath the container. Preferably also there is sufficient space between the outlet 12 and the base plate 57 so that a milk can 58 of the usual size may be placed on the base 57 to receive milk from the outlet 12, as shown in Figs. 1 and 6. Thus it will be seen that there is provided a simple and compact unit, easy to install, because all parts are supported from the base plate 57 and no elaborate foundation is necessary.

It is also now seen that this apparatus, when operated according to the preferred method above disclosed, quickly cools a large quantity of milk. It aerates the milk at the same time that it is cooled, and it holds or stores the milk after cooling so that the milk need not be transferred to a separate holding receptacle. Likewise the milk, while being held or stored, is kept at the desired lowered temperature by continued or intermittent operation of the refrigerating apparatus. The unit is entirely self-contained, the refrigerating apparatus being individual to the one milk container alone, which is a great advantage over some prior refrigerating systems in which a single compressor unit controls several different containers. In such systems, the various containers must all be maintained at the same temperature, but the present self-contained unit may be maintained at any temperature desired independently of the temperature of any other units which may be in use, so that different treatments at different temperatures may be carried out readily in the different units.

It is also to be observed that no brine is used in this apparatus, which is an advantage, because brine is usually corrosive to various materials with which it comes in contact. The liquid within the receptacle 14 is preferably plain water, which is not corrosive, and the refrigerating fluid within the coil 40 is any suitable refrigerating gas, such as those commonly used in refrigerating units.

A further advantage which will now be apparent over some of the prior milk cooling arrangements, is that only a relatively small quantity of water is necessary around the container 11, with the result that when the apparatus is set into operation there is only a small body of water to be cooled, which greatly reduces the expense over some prior forms of apparatus in which the quantity of cooling water is many times the quantity of milk which is to be cooled. A further advantage of this improved apparatus is that the cooling and aeration of the milk both takes place in a substantially closed container so that outside contamination is avoided. In fact, from the time the milk is poured into the distributor 20 through the strainer 27, until the time that it is withdrawn from the container 11 through the outlet 12, the milk is constantly in a substantially enclosed space from which dirt and bacteria are excluded.

When it is desired to clean the container 11 after all of the milk has been withdrawn therefrom, this may readily be done by removing the entire distributor bowl 20 from the top of the container, this bowl being light so that it can be readily lifted off of the container. The container then has a wide open mouth or top, making it convenient to enter the container or reach into it for cleaning purposes. The container itself is preferably of metal lined with glass, or of stainless or non-corrosive metal, or of other material which can be readily cleaned and kept in perfect sanitary condition.

A slightly different embodiment is illustrated in Figs. 4 and 5, which show the apparatus adapted for use with a milking machine. Here the container and receptacle may be constructed exactly as before, and the distributing member 20 may be the same, except that it is preferred to provide a connection through or around the bottom 21 of the distributing means through which the atmospheric pressure may be equalized on both sides of the bottom 21, but through which milk will not flow. This may conveniently be done by a pipe 60 extending through the bottom 21 and upwardly to a substantial distance above this bottom, as shown in Fig. 4, and having a liquid-tight connection with the bottom. The liquid within the distributing bowl 20 would never normally rise as high as the top of the pipe 60, and thus would never flow through the opening provided by the pipe, but air can readily flow through the pipe and thus equalize the pressures above and below the distributing bowl.

In place of the cover 25 used in the previous embodiment of the invention, the distributing bowl in this instance is provided with a somewhat similar cover 61 which is of slightly larger diameter than the member 20 and extends downwardly over the edges of the member 20 and thence has an outwardly extending marginal flange 62 above which is a reinforcing ring 63. Around the periphery are a series of clamps 64 provided with tightening screws 65, for clamping the flange 62 tightly down upon a rubber gasket 66 on an outwardly extending flange part 67 of the container 11. The rubber gasket 66 provides an air-tight seal between the cover 61 and the container 11 so that the container is completely closed in an air-tight manner by the cover. It will be noted that the rubber gasket 66 is in a position in which it does not come in contact with any of the milk or other liquid.

A vacuum pump indicated diagrammatically at 70, is connected by a conduit 71 to the space or chamber between the members 61 and 20, to produce a vacuum in this chamber and, through the pipe 60, a corresponding vacuum within the container 11. At 72 there is shown a conduit coming from the milking apparatus of any known or suitable type, which conduit likewise enters the chamber between the members 61 and 21. Due to the vacuum formed within this chamber by the pump 70, the milk is drawn from the milking apparatus into the space above the distributing means 20, and then flows, as in the other embodiment, through the restricted outlet openings 22 and against the wall 11, thence flowing in a film down this wall, being cooled and aerated and being stored in the receptacle 11.

It is to be noted that when this embodiment of the invention is used, there may be a direct connection from the milking apparatus right to the cooler, without the necessity of any traps or other devices, such as are used at present to get the milk out of the vacuum line, because the entire cooling unit itself is maintained under vacuum and the milk in flowing from the milking machines to the cooling unit does not at any time have to leave the influence of the vacuum.

Still another embodiment of the invention is disclosed in Figs. 6, 7, and 8. Here, a supplementary cooling and aerating unit is employed above the container 11, and it may be used to advantage particularly where there is available a considerable supply of cold water, as from a well or the like, with consequent cutting down of the expense of operation of the refrigerating unit. The container 11, receptacle 14, and refrigerating mechanism, may all be the same as heretofore described. At the top of the container 11 is provided distributing means or baffle means 20a similar in general to the distributing means 20 above described, and having outlet openings 22 as before, for causing the milk to flow against the side walls of the container. Instead of supplying the milk directly to this distributing member 20a, however, the milk in the present instance is first supplied to a supplementary distributing member 80 and is caused to flow thence over a supplementary cooling member cooled by the available supply of cold water, after which the milk enters the distributor 20a and flows against the side walls of the container 11 and continues its treatment and storage exactly as before.

The distributor 80 is somewhat similar to the distributor 20, having a bottom 81 sloped downwardly and outwardly as shown in Fig. 7, but having two series of restricted outlets 82 and 83 extending around the member 80 near its periphery, instead of just one series as before. The outlets 82 and 83 may be in the form of perforations, similar to the perforations 22.

The supplementary cooling member may conveniently be in the form of a hollow annular ring 85 with its axis substantially vertical and with its inner and outer sides both preferably corrugated, as shown in Figs. 7 and 8. The corrugations on one side are complementary to those on the other side, so that the space between the inner and outer walls of the ring 85 is formed, in effect, into a series of tubes which extend circumferentially around this ring. At one point, the ring is provided with a vertical header portion 88 connected in any suitable manner to the circumferential tubular portions of the ring 85 so as to supply cooling water to these tubular portions for flow therethrough either in series or in parallel, as preferred. When parallel flow is desired, the header 88 may be divided into an inlet portion and an outlet portion by a vertical partition 89. Cooling water supplied to the header on one side of the partition by a supply conduit 90, flows from the header circumferentially around the cooling ring in a horizontal direction, through the tube-like spaces best shown in Fig. 8, until it comes back to the header 88 on the opposite or outflow side of the partition 89, thence being carried away through the outlet conduit 91.

Spaced at intervals around the bottom edge of the cooling ring 85 are suitable supporting feet 95 arranged to rest on the bottom 21a of the distributor 20a and to hold the bottom edge of the ring slightly up off the bottom 21a. These feet are preferably provided in pairs slightly spread away from each other in a radial direction, as indicated in Fig. 8, so that these cooling rings could, if desired, be stacked one upon another, the feet of one ring engaging opposite sides of the upper edge of the ring next below it, to hold the two rings accurately alined with each other. In this way, the supplementary cooling unit can be built up to any height desired.

The outlet openings 82 of the distributing member 80 are arranged just inside of the upper edge of the cooling ring 85, as shown in Fig. 8, so that milk issuing through these outlet openings will fall upon the inner surface of the annular ring 85 and flow down this corrugated inner surface in the form of a film, as indicated diagrammatically by the arrows 82a. The other outlet openings 83 of the distributor 80 are arranged just outside of the top edge of the cooling ring so that the milk flowing out through these openings will fall on the outer peripheral surface of the ring and flow down this outer surface as a film, as indicated diagrammatically by the arrows 83a. When they reach the bottom edge of the ring, both the inner and outer films of milk will drop from the bottom of the ring and fall into the distributor 20a, from which the milk will issue through the openings 22 onto the side walls of the container 11 to flow down these walls and be aerated and cooled just as previously described. This preliminary cooling by the cooling ring 85 causes the milk to enter the container 11 somewhat cooler than if it were poured directly into the container, and thus places a smaller load on the refrigerating coil 40 (if the cooling ring 85 be cooled independently of the coil 40) with consequent reduction of expense of operating the refrigerating mechanism.

The top distributor 80 for supplying the milk to the ring 85, preferably has the outlet openings 82 and 83 omitted for a short distance at the place where the header 88 is located, so that milk will not flow downwardly over the header, but only over the normal corrugated portions of the cooling ring. The distributor 80 has a cover 100 which may be substantially the same as the cover 25 previously described, and which may likewise be provided with an inlet opening 101 and a strainer 102 similar to the parts 26 and 27 previously described.

In some instances, it may be desired to use the supplementary cooling ring 85 even when no supply or an insufficient supply of cold water for this cooling ring is available. In such instances, the water for use in the ring 85 may be drawn from the supply of cold water in the container 14. As shown in Fig. 6, a motor 105 may be connected to a water pump 106 which draws water through a conduit 107 from the bottom of the container 14, and which delivers the water through a conduit 108 to a valve 109 in the conduit 90 leading to the cooling ring. After passing through the cooling ring and issuing through the conduit 91 the water may pass through a valve 110 to a conduit 111 from which it may pass through the connection 112 to a nozzle 113 extending upwardly into the bottom of the receptacle 14 and thus be returned to the receptacle, serving to agitate and stir up the water in the receptacle in a useful manner. When it is desired to drain the water out of the system, this may be done through a drainage line 115 controlled by a valve 116.

In some localities a sufficient supply of cold water for the cooling ring 85 may be available, from a well or the like, during part of the year but not through the entire year. When the external supply of cooling water is not available, water may be circulated through the ring 85 by the pump and connections above described. At other times, when the cold water supply is sufficient, expense may be reduced by cutting out the pump and taking the cooling water directly from the available cold water supply, as through a conduit 120 connected to the three-way cock 109, the water leaving the system through the conduit 121 connected to the three-way cock 110. On the other hand, if a supply of cooling water is not available and if it is not desired to use water from the receptacle 14 in the supplementary cooling ring 85, then it is a simple matter to lift the supplementary cooling ring off the unit and lay it aside until such time as a supply of cooling water becomes available, and use of the supplementary cooling ring can be resumed with advantage. From this standpoint, the apparatus is quite flexible and can be altered readily to suit any particular circumstances.

Obviously the use of the motor 105 and pump 106, in drawing water from the receptacle 14 and pumping it back into the receptacle through the nozzle 113, will have the effect of stirring up or agitating the water in this receptacle. Such agitation of the cooling water is often desirable, in order that all of this water may be of uniform temperature throughout and may receive the full benefit of any supply of ice which may be localized on a part only of the coil 40. Hence it may be desirable at times to employ the pump 106 purely for agitation purposes, even when the supplementary cooling ring 85 is not in use, and this may be readily accomplished by short-circuiting the conduits 90 and 91 by providing any suitable cross connection between them, below the ring 85.

Ice forming on the coil 40 usually forms progressively, starting at the upper or outlet end of the coil, where the coil is coldest. The coil shown in Fig. 7 is a single spiral or helix, with successive convolutions relatively close together. With such a coil, it may happen that before any ice forms on the lower part of the coil, the ice on the upper part of the coil has grown so thick that the mass of ice on one convolution substantially touches the mass of ice on adjacent convolutions, thus forming substantially a solid annular wall of ice acting as a partition in the receptacle 14 and reducing the efficiency of the cooling operation by interfering with the circulation of the water.

To overcome this difficulty, it is proposed, as a further and important feature of the invention, to employ a special form of coil such as shown in Fig. 9. Here, the container 11, receptacle 14, parts 15 and 16, and in fact all of the parts except the coil 40, may be constructed just as previously described, and may be used with or without the supplementary cooling means 85, as preferred. The coil itself, however, instead of being a single helix, is in a form which may be described for convenience as a double helix. It has an inner or first helical portion 40a, descending from the top to the bottom, then at the bottom of the coil the diameter is slightly expanded and the coil rises again to the top in a second or outer series of helical convolutions 40b of slightly larger diameter than the convolutions 40a, as may be plainly seen from Fig. 9.

When this arrangement is used, the successive convolutions of each separate helix may be spaced farther from each other, in an axial direction, than when only a single helix is used, because the total coil area desired can be split up between the two helixes and thus fewer convolutions are needed in each helix. With this increased spacing between convolutions, there is much less danger of the formation of ice in a substantially solid wall. Under normal conditions, a considerable quantity of ice may form on each convolution without coming into contact with the ice on adjacent convolutions of the same helix. While the ice on one convolution of one helix may unite with ice on an adjacent convolution of the other helix, this is not particularly detrimental because the two helixes are wound in opposite directions (one like a right-hand screw and the other like a left-hand screw) with the convolutions of one helix crossing those of the other helix, so that any contact of ice on one helix with ice on the other helix would be only at spaced points and would not form a solid wall to interfere seriously with the circulation of the water. Moreover, to reduce still further the possibility of ice wall formation, the spacing of the convolutions of one helix may be different from that of the other helix. For example, the spacing or pitch of the convolutions 40b of the outer helix may be greater than the spacing or pitch of the convolutions 40a of the inner helix, as shown in Fig. 9.

It will be seen from the foregoing description that there has been provided a novel and improved cooling method, as well as simple, effective, and improved apparatus having the various desirable characteristics above set forth. While this apparatus is especially useful in connection with the handling of milk it is not limited necessarily to this field, and it is to be understood that many features of the invention are useful in the handling of other liquids in addition to milk as will be apparent to those skilled in the art.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The method of cooling and storing liquid which comprises providing a container, surrounding the container with a supply of cooling fluid, and causing the liquid to be cooled to flow downwardly over the cooled walls of the container in a thin film and to accumulate within the container.

2. The method of quickly cooling a supply of liquid, which comprises providing a supply of water to be cooled by a refrigerating unit, cooling said water in advance of the cooling of the liquid to be cooled, to an extent sufficient to cause formation of a substantial quantity of ice within said water, and subsequently causing the liquid to be cooled to flow in a thin film in close proximity and heat-exchanging relationship to the cooled water and ice.

3. Apparatus for cooling and storing liquid comprising a container including a heat-transmitting wall, means for holding a supply of cooling fluid in contact with one side of said wall, and means for causing liquid introduced into said container to flow down the other side of said wall in the form of a thin film and to accumulate in said container.

4. Apparatus for cooling and storing liquid comprising a liquid container, means for holding a supply of cooling fluid around said container in external contact therewith, and means for directing liquid to be cooled against the inner surface of an external wall of said container near the top thereof so that said liquid will flow down said wall in the form of a thin film and be cooled thereby and accumulate in said container.

5. Apparatus for cooling liquid comprising a container substantially closed except at its top, means for holding a supply of cooling fluid around said container in external contact with a substantial surface area thereof, and guiding means for directing liquid introduced into the top of said container against the inner surface of an external wall thereof so that the introduced liquid will flow down said wall in the form of a film and will be cooled thereby.

6. Apparatus for cooling liquid comprising a container substantially closed except at its top, means for holding a supply of cooling fluid around said container in external contact with a substantial surface area thereof, guiding means for directing liquid introduced into the top of said container against the inner surface of an external wall thereof so that the introduced liquid will flow down said wall in the form of a film and will be cooled thereby, and controlled outlet means adjacent the bottom of said container for withdrawing cooled liquid therefrom at will.

7. Apparatus for cooling liquids comprising a container having a top opening and a substantially closed bottom, baffle means adjacent said top opening for deflecting to the side walls of the container a substantial part of any liquid introduced into the container so that such liquid will flow down said side walls in contact therewith, means for holding a supply of cooling water around said container in external contact therewith, and refrigerating means at least partially within said cooling water holding means for refrigerating said cooling water.

8. Apparatus for cooling liquids comprising a container having a top opening and a substantially closed bottom, baffle means adjacent said top opening for deflecting to the side walls of the container a substantial part of any liquid introduced into the container so that such liquid will flow down said side walls in contact therewith, means for holding a supply of cooling water around said container in external contact therewith, and means for forming ice within said cooling water around said container, to build up a refrigerant supply to promote rapid cooling of liquid introduced into said container.

9. Liquid cooling apparatus comprising a liquid container having a top opening and a substantially closed bottom, a liquid receptacle surrounding and spaced from said container and adapted to hold liquid in external contact with with said container, a coil surrounding said container within said receptacle, and means individual to said coil for circulating refrigerating fluid through said coil.

10. Liquid cooling apparatus comprising a liquid container having a top opening and a substantially closed bottom, means adjacent said top opening for causing at least a substantial portion of liquid introduced into said top opening to flow down a side wall of said container in a film in contact with said side wall, a liquid receptacle surrounding and spaced from said container and adapted to hold liquid in external contact with said container, and a refrigerating conduit surrounding said container within said receptacle.

11. Liquid cooling apparatus comprising a liquid container having a top opening and a substantially closed bottom, a receptacle surrounding said container and spaced therefrom for holding cooling fluid in external contact with said container, and a liquid receiving hopper extending substantially across said top opening of said container, said hopper having a plurality of discharge openings adjacent a side wall of said container so that liquid introduced into said hopper will be discharged therefrom through said openings onto said side wall of said container and will flow down said side wall to be cooled thereby.

12. Liquid cooling apparatus comprising a liquid container having a top opening and a substantially closed bottom, a receptacle surrounding said container and spaced therefrom for holding cooling fluid in external contact with said container, and a liquid receiving hopper adjacent the top of said container, said hopper including a bottom extending across and substantially closing said top opening of said container and having a plurality of relatively small outlet openings adjacent a side wall of said container for directing liquid introduced into said hopper against said side wall to flow down said side wall and be cooled thereby.

13. Liquid cooling apparatus comprising a liquid container having a top opening and a substantially closed bottom, a receptacle surrounding said container and spaced therefrom for holding cooling fluid in external contact with said container, a hollow upstanding body above said container, means for circulating cooling fluid through said body to cool a wall thereof, means for supplying liquid to said cooled wall to flow downwardly over said wall in a film, and means for causing liquid discharged from said wall to flow into said container and down a wall thereof to be additionally cooled thereby.

14. Liquid cooling apparatus comprising a liquid container having substantially closed side and bottom walls so that liquid may accumulate therein, means for holding a supply of cooling fluid in external contact with a substantial area of said walls of said container to cool said walls, a hollow annular cooling element positioned over said container substantially in vertical alinement therewith, means for supplying cooling fluid to said element to flow therethrough, a liquid receiving hopper over said annular element, outlet means for directing liquid from said hopper onto a wall of said annular element to flow in a film down said wall and be cooled thereby, means for directing liquid from said wall of said annular element to a side wall of said container to flow in a film down said wall and be additionally cooled thereby, and means for withdrawing liquid at will from said container without interruption to the flow of liquid thereinto.

15. Apparatus for cooling and holding milk comprising a heat-transmitting wall, means for holding cooling water in contact with one side of said wall, refrigerating means for forming ice in place within said water to provide a reserve refrigeration supply therein, means for supplying a film of milk to the opposite side of said wall near the upper part thereof so that said film will flow down said wall and said milk will thereby be aerated and cooled, and means substantially enclosing the milk side of said wall to exclude dirt and other foreign matter from the milk flowing down said wall.

16. Apparatus for cooling and holding milk comprising a heat-transmitting wall, means for holding cooling water in contact with one side of said wall, refrigerating means for forming ice in place within said water to provide a reserve refrigeration supply therein, said refrigerating means including a refrigerant conduit within said water having two series of convolutions with the convolutions of one series extending in a direction different from that of the adjacent convolutions of the other series, and means for supplying a film of milk to the opposite side of said wall near the upper part thereof so that said film will flow down said wall and said milk will thereby be aerated and cooled.

17. Liquid cooling and holding apparatus comprising a container having substantially closed side and bottom walls so that liquid may be stored therein, means for holding a supply of cooling fluid around said walls to cool them, refrigerating means including a refrigerant conduit having two helical series of convolutions each extending around said container within said cooling fluid holding means, the convolutions of one series forming substantially a right hand helix and those of the other series forming substantially a left hand helix, and liquid distributing means adjacent the top of said container for distributing liquid over the side walls of said container to flow down said side walls in the form of a film and to be cooled thereby.

18. Liquid cooling and holding apparatus comprising a container having substantially closed side and bottom walls so that liquid may be stored therein, means for holding a supply of cooling fluid around said walls to cool them, thermal insulating means around said cooling fluid holding means, and liquid distributing means adjacent the top of said container for distributing liquid substantially uniformly over the side walls of said container to flow down said side walls in the form of a film and to be cooled thereby.

19. Liquid cooling apparatus comprising a liquid container having substantially closed side and bottom walls, means for holding a supply of cooling fluid around said walls to cool them, means forming a distributing chamber adjacent the top of said container, said distributing chamber having restricted outlet means for distributing liquid to a side wall of said container to flow down said side wall in a film, means forming a substantially air-tight closure for said container and distributing chamber, means for producing a partial vacuum within said container and chamber, and liquid inlet conduit means opening into said chamber so that liquid may be drawn into said chamber through said conduit means under the influence of said vacuum in said chamber.

OTTO W. GREENE.